(No Model.) 2 Sheets—Sheet 1.
I. W. BLISS.
APPARATUS FOR HEATING RAILWAY CARS.
No. 470,830. Patented Mar. 15, 1892.
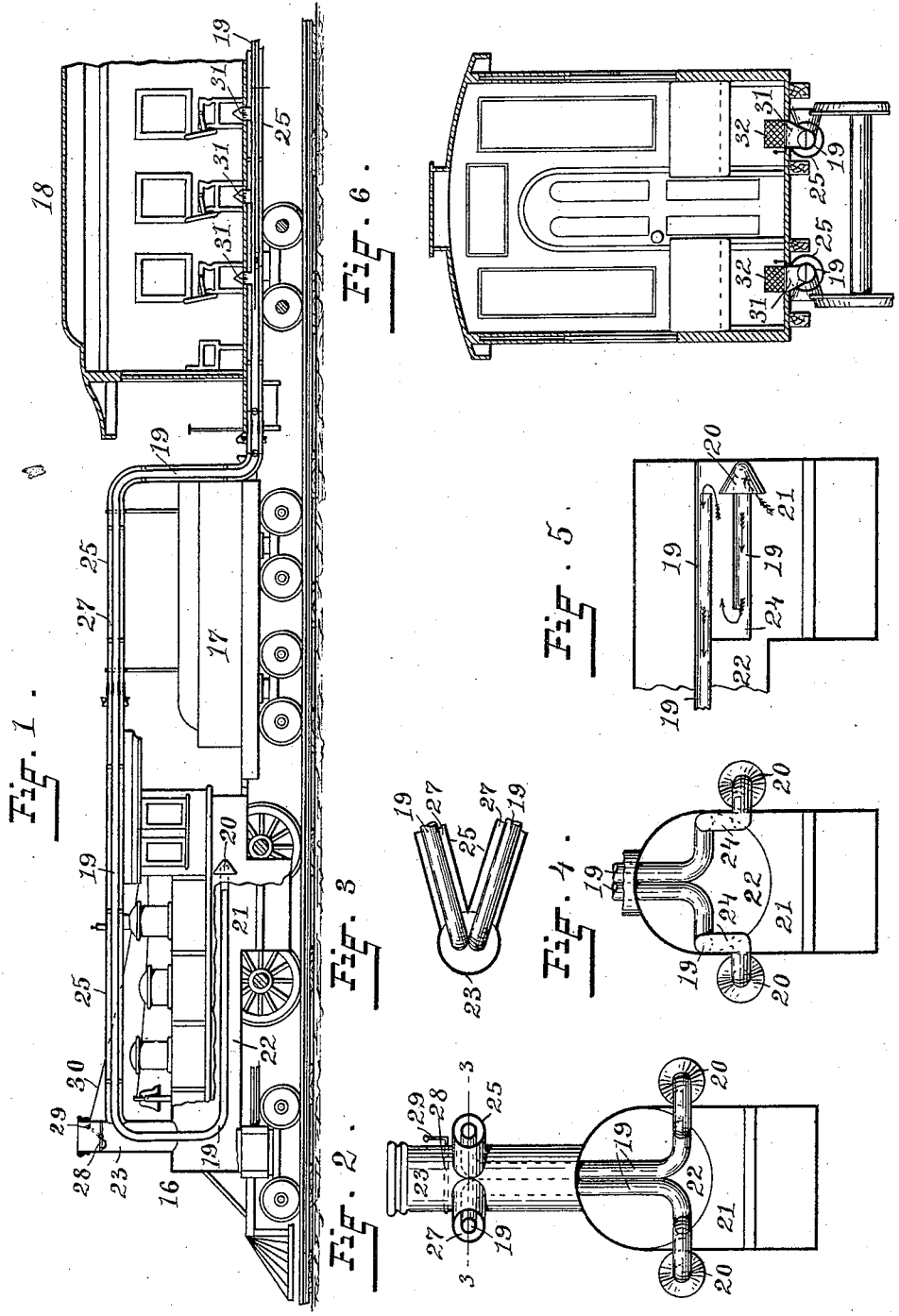
WITNESSES:
Chas. H. Luther Jr.
Willis Fowler
INVENTOR:
Irving W. Bliss
by Joseph A. Miller
Attys (No Model.) 2 Sheets—Sheet 2.

I. W. BLISS.
APPARATUS FOR HEATING RAILWAY CARS.

No. 470,830. Patented Mar. 15, 1892.

WITNESSES:
Chas. H. Luther Jr
Willis Fowler

INVENTOR:
Irving W. Bliss
by Joseph A. Miller & Co.
Attys

UNITED STATES PATENT OFFICE.

IRVING W. BLISS, OF PROVIDENCE, RHODE ISLAND.

APPARATUS FOR HEATING RAILWAY-CARS.

SPECIFICATION forming part of Letters Patent No. 470,830, dated March 15, 1892.

Application filed May 10, 1887. Serial No. 237,698. (No model.)

*To all whom it may concern:*

Be it known that I, IRVING W. BLISS, of the city and county of Providence, and State of Rhode Island, have invented certain new and useful Improvements in Apparatus for Heating Railway-Trains, of which the following is a full, clear, and exact description, reference being had to the accompanying drawings, forming part of this specification.

This invention relates to improvements in apparatus for heating railway-trains.

One object of my invention is to heat railway-cars by means of highly-heated fresh air and at the same time to derive the heat from the locomotive, so as to have the heating source remote from the cars, thereby insuring safety from fire in case of accident.

Another object of my invention is to economize the expense of heating railway-trains.

Another object of my invention is to discharge the products of combustion arising from the locomotive at points in the rear of the cars of the train and to utilize the said products as an additional heating source and also to utilize the smoke-pipe conveying such products as a protective jacket or cover for my hot-air pipe.

Other objects of my invention are to provide certain detailed constructional improvements in the novel apparatus I have shown.

The invention consists in certain peculiar combinations of novel parts, which will hereinafter be more fully described, and pointed out in the claims.

In order that my invention may be fully understood, I have illustrated in the accompanying drawings and will proceed to describe the best forms of my invention so far devised by me, with the knowledge that the same may be modified in details.

Figure 7:
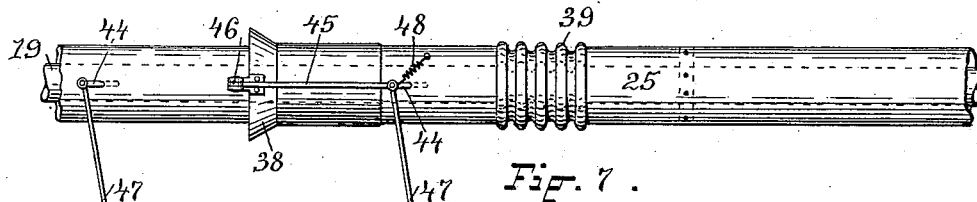
Figure 8:
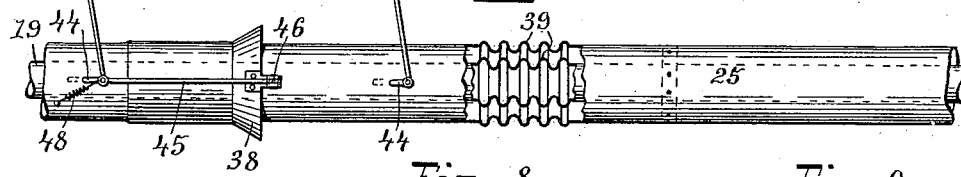
Figure 10:
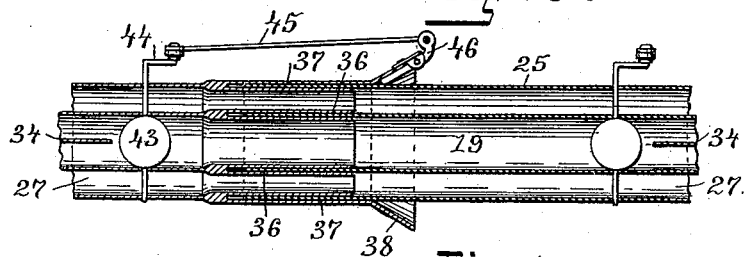
Figure 9:
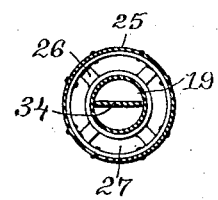
Figures 11, 12, 13:
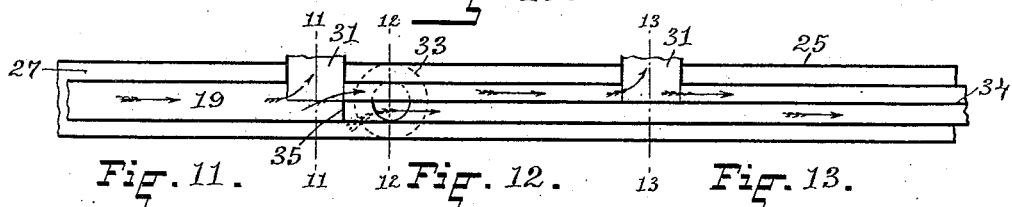
Figure 14:
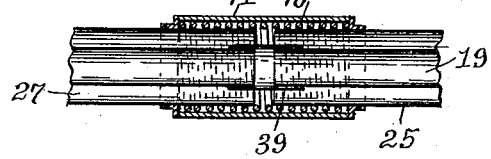

In the accompanying drawings, Figure 1 is a side view of a portion of a railway-train which is provided with my improved heating apparatus, a portion of the locomotive is broken away, and the car and the pipes are shown in longitudinal sectional views. Fig. 2 is an enlarged rear view of a portion of the steam-generating apparatus of the locomotive and shows the disposition of the hot-air and smoke pipes. Fig. 3 represents a sectional view of the smoke-stack and the smoke and the hot-air pipes, the section being taken on line 3 3 in Fig. 2. Fig. 4 represents a view similar to that shown in Fig. 2 and illustrates another arrangement for heating the hot-air pipes. Fig. 5 represents a central longitudinal sectional view of a portion of the apparatus shown in Fig. 4. Fig. 6 represents an enlarged transverse sectional view of the car shown in Fig. 1. Fig. 7 represents an enlarged plan view of the sectional hot-air and smoke-pipes provided with the automatic damper-controlling devices and showing the flaring ends of the hot-air pipes and the yielding sections constructed in both the smoke and hot-air pipes. The arrangements of the pipes are the same as shown in Figs. 1 and 6. Fig. 8 represents an enlarged longitudinal sectional view of the smoke-pipe and contained hot-air pipe provided with the damper devices, and shows the novel telescoping ends of the pipe ends for making a tight joint when the pipe-sections are coupled. Fig. 9 represents a cross-sectional view of Fig. 8. Fig. 10 represents another longitudinal sectional view of the smoke-pipe and contained hot-air pipe, and shows the constructions of the registers, cold-air supply, and the diaphragm in the hot-air pipe. Fig. 11 represents a sectional view taken on line 11 11 in Fig. 10. Fig. 12 represents a sectional view taken on line 12 12 in Fig. 10. Fig. 13 represents a sectional view taken on line 13 13 in Fig. 10. Fig. 14 represents a longitudinal sectional view of a peculiar and novel joint formed in the smoke-pipe and the contained hot-air pipe.

In the said drawings like numbers of reference designate corresponding parts throughout.

Referring to the drawings, the numbers 16, 17, and 18 designate, respectively, an ordinary railway locomotive, tender, and passenger-car, which are attached together in a train.

The hot-air pipe 19 is provided at the front end with a forwardly-opening mouth 20, which is formed flaring or funnel-shaped for the easy introduction of fresh air therein. This pipe is preferably made of sheet-iron and traverses the fire-box 21 and the boiler 22 and the smoke-stack 23 of the locomotive, and thence extends over the top of the locomotive and tender down underneath the car-floor to the end of the train.

In its passage through the several parts of the steam-generating apparatus of the locomotive—namely, the fire-box, boiler, and smoke-stack—the hot-air pipe presents a very extended surface to be heated, and consequently the cold fresh air introduced into the pipe at its mouth 20 will become intensely heated by the large radiating surface which it will be passed over in the pipe.

The hot-air pipe 19 may be formed into a coil within the fire-box, or it may be arranged in either of the ways I have shown in the respective views of Figs. 1 and 2 and 4 and 5, wherein the latter views show a hot-air chamber 24, formed in the fire-box 21.

The hot-air pipe 19 passes into the chamber 24 and thence out again, the pipe being disconnected in the chamber, as shown in Figs. 4 and 5.

The hot-air pipe 19 may be provided with a suitable protective jacket or covering in order to prevent the rapid radiation of the heat from the pipe, which is necessarily exposed. In order to jacket the hot-air pipe and protect the same, I employ the surrounding smoke-pipe 25, which conveys the products of combustion away from the locomotive. The smoke-pipe 25 springs from the smoke-stack 23 of the locomotive and traverses the train. The hot-air pipe is of smaller diameter than the smoke-pipe and is supported within the center of the same by means of the ribs 26, (see Fig. 9,) so as to provide an annular space 27 between the two pipes. This construction of surrounding the hot-air pipe with the smoke-pipe provides an additional heating source, for the hot-air pipe, since the highly-heated products of combustion coming from the locomotive are caused to circulate about the exterior of the hot-air pipe throughout the train, the said products being discharged at the open end of the smoke-pipe located at the rear of the train.

In order to control the admission and exclusion of the contents of the smoke-stack into and from the connected smoke-pipe 25, I have provided the pivoted deflector-plate 28, which is mounted in the stack above the openings of the smoke-pipes and is provided with a crank 29, to which is secured a cord 30, which runs to the locomotive-cab, from where it may be readily manipulated by the engineer. The registers 31 are small chutes which lead from the interior of the hot-air pipes and pass through the smoke-space 27 and the pipe 25 and project up through the car-floor into the interior of the cars, where they are formed in any suitable shape and are provided with the gratings 32. The registers may be disposed as described throughout the cars. I have shown them as arranged one under each seat of the car.

To facilitate the flow of hot air through the hot-air pipes, I have provided the same with a cold-air supply 33, which consists of a small pipe inserted into the hot-air pipe, and which passes through the smoke-pipe and is in communication with the exterior of the latter and the interior of the former. (See Figs. 10 and 12.) In order to sufficiently heat the cold air introduced by the supply-pipe 33 before the air is delivered to the registers, I have constructed the hot-air pipe with a longitudinally-disposed diaphragm 34, which extends for some little distance along the interior of said pipe and divides the same longitudinally into two parts. One end of one of the halves of said pipe is closed, as at 35, so as to form a pocket-like construction, as will be readily understood by referring to Figs. 8, 9, 10, 11, 12, and 13. Thus the cold air introduced by the supply-pipe 33 enters within the pocket formed to one side of the diaphragm 34 and passes along the pocket out into the main channel or bore of the hot-air pipe. The registers 31 are in free communication by means of the unobstructed half of the hot-air pipe 19, the said half being upon the reverse side of the diaphragm from where the pocket is located.

I have shown a double system of the combined hot-air and smoke pipes, one line thereof running along near each side of the train. The pipes are to be secured and supported in any well-known manner.

The pipes are permanently jointed and maintained together throughout the length of the locomotive and each car, but are adapted to be coupled and uncoupled at the end of the locomotive and at each end of the cars. I therefore construct the combined pipes in complete sections for each car of a train and form the ends of the sections so that the sections may be coupled and uncoupled automatically at the same time that the cars are coupled and uncoupled. To effect this I construct one end of the sectional smoke-pipe with a double thickness of pipe-wall and with the annular space 37, adapted to receive the plain smooth end of another section. I likewise construct the sectional hot-air pipe with the annular chamber 36, which may readily receive the straight end of another section of hot-air pipe. (See Fig. 8.) It will at once be seen that by virtue of this construction the ends of the sections of pipes will readily telescope and form a tight joint when the cars are coupled.

In order to facilitate the automatic coupling of the sections of pipes, I furnish one end of the sections with the flaring flange 38, which will receive and properly guide the end of the entering section of smoke-pipe into position, and thus bring the hot-air-pipe sections into alignment and cause the sections to readily telescope.

In order to allow a certain amount of compression or yielding of the pipe-sections, the same are constructed with yielding portions or sections.

In Fig. 7 the smoke-pipes and hot-air pipes are shown as formed at corresponding points with the transverse corrugations 39, which extend circumferentially about the pipes and permit of the same yielding longitudinally and also allow a limited lateral movement. In Fig. 14 I have shown another way of constructing a yielding portion in the combined pipes, whereby the same are rendered less rigid and less liable to become buckled up in the severe strain exerted by the coupling up of the pipes. The ends of both the hot-air pipes and the surrounding smoke-pipes are placed near together and the ends of the former are fitted with a sleeve 39, which may be secured to either of said ends, and the other end may freely slide therein. The spiral spring 40 is placed over the two ends of the smoke-pipe and is surrounded with a flexible covering 41, which is fastened to the outside of the smoke-pipe. This yielding construction will obviously serve to prevent the pipes from buckling up when compressed longitudinally.

I have provided each end of the sections of hot-air pipes with a damper 43, which may automatically be opened when the pipes are coupled up and closed when the same are uncoupled. The axles of the dampers 43 are journaled in the smoke-pipe, and one end of each axle projects to the exterior of the smoke-pipe and is provided with a crank 44, to which is hinged the link 45, the other end of which is pivoted on the flange 38 of the smoke-pipe. The trip 46 extends downwardly sufficiently far to be tripped by the entering section of pipe, and thereby thrown into the position shown in Figs. 7 and 8. The damper and trip device are so adjusted that when the trip 46 is moved into the position alluded to the damper 43 will be wide open. When the pipes are uncoupled, the trip 46, being without the necessary support, will gravitate into nearly vertical position and thereby automatically close the damper in an evident manner. Where the double system of pipes is employed I have devised means whereby the closing or opening of a damper in one pipe will also accordingly operate the corresponding damper in the accompanying pipe-section which runs parallel therewith. This I accomplish by the use of the connecting-rod 47, which is hinged across from the damper-crank 44, which is provided with a link 45, to the opposite damper-crank, which is not provided with a link, and by means of this arrangment one trip 46 may serve to automatically control the corresponding dampers of the parallel pipe-sections in an obvious manner. The spring 48 is secured by its respective ends to the damper-crank 44 and the exterior of the smoke-pipe 25 and tends to normally keep the dampers closed, so that upon withdrawal of the coupled pipe-sections the crank will be turned by the force of said spring in addition to the weight of the trip 46.

From the foregoing description it will be seen that by means of my improved combined smoke-pipe and hot-air pipes the cars of the train may be well heated with hot air, which is heated at points remote from the cars, thereby avoiding the possibility of the cars becoming ignited by the heating source in case of accident. Moreover, the pipe-sections are self-coupling and uncoupling and the dampers are automatically controlled.

Having thus described my invention, I claim as new and desire to secure by Letters Patent—

1. The combination, as hereinbefore set forth, with the smoke-pipe, of the hot-air pipe supported in the smoke-pipe and provided with a longitudinally-disposed diaphragm or partition, the registers communicating with the interior of the hot-air pipe and passing through the smoke-pipe and to one side of the said diaphragm, the cold-air supplies communicating with the interior of the hot-air pipe and passing through the smoke-pipe to the other or reverse side of the diaphragm, the space between the diaphragm and one side of the hot-air pipe being closed, substantially as herein described.

2. The combination, as hereinbefore set forth, with the smoke-pipe 25, of the contained hot-air pipe 19, provided with the diaphragm 34, having the closed end 35 and provided with the registers 31, substantially as herein described.

3. The combination, as hereinbefore set forth, with the smoke-pipe 25, having the end formed with the annular chamber 37, and the hot-air pipe 19, arranged within the smoke-pipe and having the end formed with the annular chamber 36, of the next entering sections of smoke-pipe and hot-air pipe, substantially as described.

4. The combination, as hereinbefore set forth, with the smoke-pipe 25 and the contained hot-air pipe 19, of the damper 43, provided with the crank 44, the spring 48, the trip 46, and the link 45, connecting the trip and the crank, substantially as described.

5. The combination, as hereinbefore set forth, with double system of the smoke-pipe 25 and the contained hot-air pipe 19, of the dampers 43, each provided with the crank 44, the pivoted trip 46, the link 45, connecting the crank and the trip, and the connecting-rod 47, connecting the dampers, substantially as herein described.

In witness whereof I have hereunto set my hand.

IRVING W. BLISS.

Witnesses:
M. F. BLIGH,
J. A. MILLER, Jr.